United States Patent
Kronrod et al.

(10) Patent No.: US 8,054,946 B1
(45) Date of Patent: Nov. 8, 2011

(54) METHOD AND SYSTEM FOR ONE-WAY DELAY MEASUREMENT IN COMMUNICATION NETWORK

(75) Inventors: Mikhail Kronrod, San Jose, CA (US); Vladimir Movshovich, Mountain View, CA (US); Elizaveta K. Tavastcherna, San Jose, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 1365 days.

(21) Appl. No.: 11/609,872

(22) Filed: Dec. 12, 2006

Related U.S. Application Data

(60) Provisional application No. 60/749,781, filed on Dec. 12, 2005.

(51) Int. Cl.
 *H04M 1/24* (2006.01)
(52) U.S. Cl. ............ 379/22; 379/22.01; 379/22.02; 379/24
(58) Field of Classification Search ............ 379/22, 379/1–4, 9, 10.02, 10.3, 27.01, 29.1, 10.01, 379/15.01, 22.02, 24, 31, 23
See application file for complete search history.

(56) References Cited

U.S. PATENT DOCUMENTS

| | | | | |
|---|---|---|---|---|
| 5,280,629 A * | 1/1994 | Lo Galbo et al. | ............ | 455/503 |
| 7,590,222 B1 * | 9/2009 | Smith | ............ | 379/31 |
| 2003/0093513 A1 * | 5/2003 | Hicks et al. | ............ | 709/224 |
| 2004/0150720 A1 * | 8/2004 | Loew | ............ | 348/182 |
| 2004/0186731 A1 * | 9/2004 | Takahashi et al. | ............ | 704/277 |
| 2004/0209606 A1 * | 10/2004 | Cleary et al. | ............ | 455/415 |

FOREIGN PATENT DOCUMENTS

JP   2004221764 A   *   8/2004

* cited by examiner

*Primary Examiner* — Melur Ramakrishnaiah
(74) *Attorney, Agent, or Firm* — Haynes Beffel & Wolfeld LLP; Ernest J. Beffel, Jr.

(57) ABSTRACT

A pilot signal is transmitted from a transmitting device through a communication network under test to a receiving device. The pilot signal is transmitted at a known transmit time and in a voice channel. Incoming signals within the voice channel at the receiving device are monitored to detect receipt of the pilot signal. A receipt time of the pilot signal at the receiving device is identified. The one-way delay (OWD) is determined as a difference between the receipt time of the pilot signal at the receiving device and the transmit time of the pilot signal from the transmitting device.

19 Claims, 5 Drawing Sheets

METHOD AND SYSTEM FOR ONE-WAY DELAY MEASUREMENT IN COMMUNICATION NETWORK

CLAIM OF PRIORITY

This application claims the benefit of U.S. Provisional Application No. 60/749,781, filed Dec. 12, 2005.

BACKGROUND

Testing of communication equipment and networks often involves emulating telephone calls to generate diagnostics regarding the connection and performance of the calls. The emulated calls can exercise many different components within the communication network, including combinations of analog and digital components. Due to the complexity of modern communication networks and the combined use of analog and digital components, it is difficult to assess the performance of the communication network on a component-level basis. For example, in determining the one-way delay (OWD) corresponding to the time required for a voice packet to travel through the communication network from a transmitting phone to a receiving phone, it is difficult if not impossible to address the OWD on a component-by-component basis. Therefore, a solution is needed for determining OWD through a communication network without requiring the communication network to be evaluated on a component-level basis with respect to the time required for the voice packet to be transmitted through each component. Additionally, the solution should be applicable to heterogeneous communication networks that combine analog and digital communication technologies.

SUMMARY

In one embodiment, a method is disclosed for determining a one-way delay (OWD) through a communication network. The method includes an operation for transmitting a pilot signal from a transmitting device through the communication network to a receiving device. The pilot signal is transmitted from the transmitting device at a known transmit time and in a voice channel. The method also includes an operation for monitoring signals received in the voice channel at the receiving device to detect receipt of the pilot signal. The method further includes an operation for identifying a receipt time at which the pilot signal is received at the receiving device. Then, the OWD is determined as a difference between the receipt time of the pilot signal at the receiving device and the transmit time of the pilot signal from the transmitting device.

In another embodiment, a system is disclosed for determining a OWD through a communication network. The system includes a transmitting device defined to transmit a pilot signal in a voice channel through the communication network at a known transmit time. The system also includes a receiving device defined to receive signals in the voice channel of the communication network and detect receipt of the pilot signal to be transmitted from the transmitting device. The receiving device is further defined to record a receipt time at which the pilot signal is received at the receiving device. Also, a clock of the receiving device is synchronized with a clock of the transmitting device. A difference between the receipt time of the pilot signal at the receiving device and the transmit time of the pilot signal from the transmitting device represents the OWD through the communication network.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
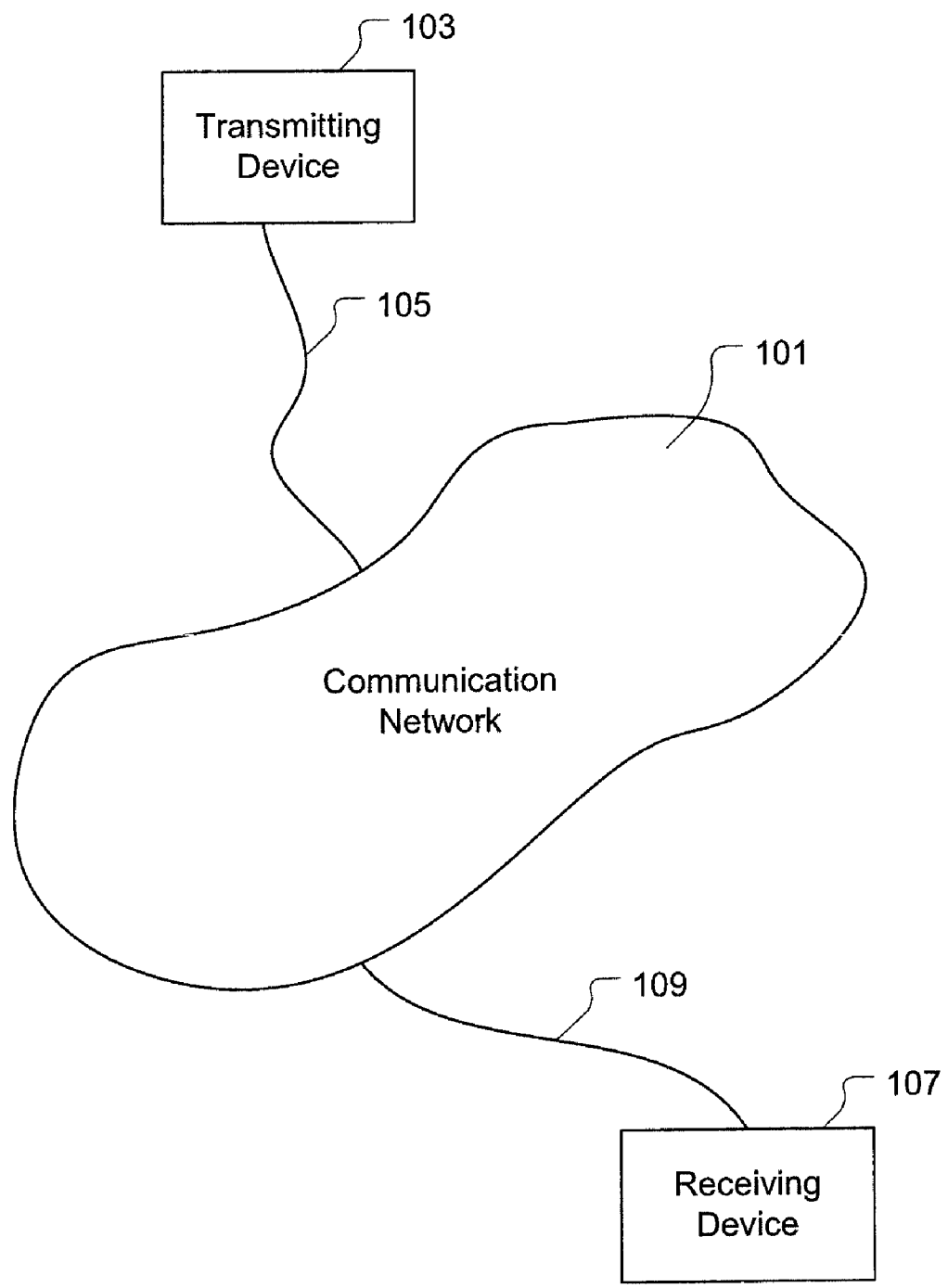
FIG. 1 is an illustration showing a communication system, in accordance with one embodiment of the present invention.

FIG. 1 is an illustration showing a communication system, in accordance with one embodiment of the present invention. The communication system includes a transmitting device 103, a communication network 101, and a receiving device 107. The transmitting device is capable of communicating with the communication network 101 through a connection 105. Also, the receiving device 107 is capable of communicating with the communication network 101 through a connection 109.

In one embodiment, each of the transmitting device 103 and the receiving device 107 is represented by a telephone and the communication network 101 is defined as a network configured to provide telephony services. In this embodiment, the quality of voice communication from the transmitting device 103 to the receiving device 107 can be affected in many ways. For example, if the voice communication from the transmitting device 103 is delayed by the communication network 101, the receiving device 107 may not receive the transmitted voice communication in a time period expected by the transmitting party. In this situation, the responsive voice communication from the receiving device 107 will also be delayed. Thus, thinking that the original voice communication was not properly received, the transmitting party may repeat the original voice communication at the same time the responsive voice communication is received. It should be appreciated that such delays would make a voice conversation difficult at best.

In diagnosing communication delay issues, such as that described above, a one-way delay (OWD) property is defined for each channel within the communication network 101. The OWD corresponds to the time period required for a voice packet to travel from the transmitting device 103, through the communication network 101, to the receiving device 107. An acceptable OWD for voice communication in general conversation is less than about 300 milliseconds (ms). Evaluation of communication quality through a particular communication network includes measurement of the OWD.

One method for computing the OWD measurement involves determining delays associated with individual components and/or sub-systems within the communication network, and computing a sum of these delays. However, this method of OWD measurement requires detailed knowledge of the communication network structure and properties. Additionally, it should be appreciated that determination of delays associated with individual components and/or sub-systems within the communication network can be expensive in terms of resources and time, particularly in modern complex communication networks.

To avoid the resource and time expense of determining delays associated with individual components and/or sub-systems within the communication network, a method and system is provided for performing a OWD measurement of a communication network without requiring composition or operational knowledge of the communication network. The OWD measurement is performed in the voice channel of the communication network. More specifically, the OWD measurement includes transmitting particular sound patterns from a transmitting device, through a communication network, to a receiving device. The transmit time of the particular sound patterns is known. Upon recognition of receipt of the particular sound patterns at the receiving device, the receipt time of the particular sound patterns is known. Because the clocks of the transmitting and receiving devices are synchronized, knowledge of the transmit time and receipt time of the particular sound patterns enables computation of how long it took for the particular sound patterns to travel from the transmitting device to the receiving device, i.e., the OWD.

It should be appreciated that because the OWD measurement is performed in the voice channel based on transmission and receipt of sound patterns, the OWD measurement is not concerned with manipulations of the sound patterns that may occur within the communication network. For example, the OWD measurement captures delay associated with transformation of the sound patterns between the analog and digital domains within the communication network. However the OWD measurement does not require knowledge of how the transformations are performed or that they even occurred. Thus, the voice channel-based OWD measurement is particularly useful in modern communication networks that utilize more complex transformations such as those required for voice over internet protocol (vow) communication.

The voice channel-based OWD measurement is facilitated in part by the use of a test sound pattern that can be transmitted through the communication network with minimal distortion. Also, the voice channel-based OWD measurement is further facilitated by the use of a test sound pattern that can be recognized at the receiving device. Therefore, use of an appropriate test sound pattern is important for enabling operability of the OWD measurement method and system as described herein. The test sound pattern or voice pattern used in conjunction with the OWD measurement is referred to as a pilot signal. The pilot signal is defined to travel through the communication network with minimal distortion. For example, the pilot signal is resistant to distortion associated with processing through various encoders/decoders (CO-DECs) within the communication network. Also, the pilot signal is defined to be recognizable by the receiving device. In one embodiment, the receiving device applies a pilot recognition algorithm to all incoming signals. The pilot recognition algorithm is defined to detect the pilot signal when present within the incoming signals.

Figure 2:
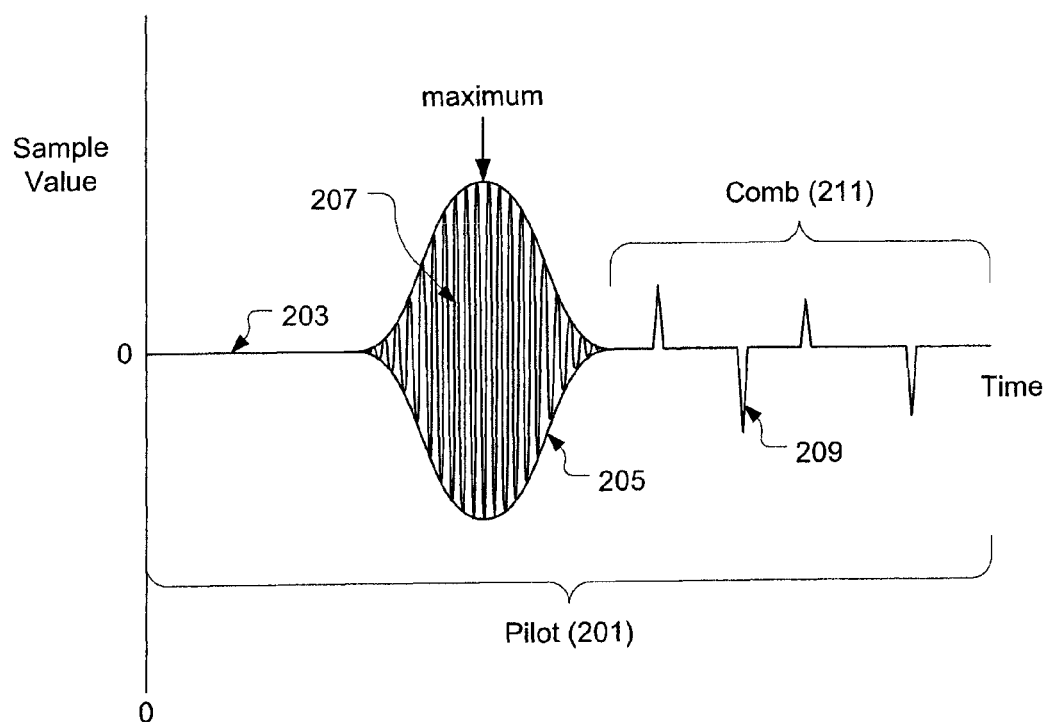
FIG. 2 is an illustration showing an exemplary representation of a pilot signal for use in OWD measurement, in accordance with one embodiment of the present invention.

FIG. 2 is an illustration showing an exemplary representation of a pilot signal 201 for use in OWD measurement, in accordance with one embodiment of the present invention. The pilot signal 201 is defined to cover a temporal range including a silent portion 203, a Gaussian-shaped signal portion 205, and comb portion 211. The Gaussian-shaped signal portion 205 of the pilot signal 201 is filled by a sinusoidal signal 207. A maximum of the Gaussian-shaped signal 205 is capable of being detected as a temporal reference within the pilot signal 201. In some situations, the pilot signal recognition can be assisted using spike signals 209 present within the comb portion 211 of the pilot signal 201.

The sample value represented in the pilot signal 201 depiction of FIG. 2, corresponds to sample values as used in digital telephony. More specifically, in digital telephony, an analog sound pattern is digitized by measuring and recording a digital value of the amplitude of the sound pattern about every 125 microseconds. Each measured digital value of the amplitude of the analog sound pattern is called a sample. In the case of a 125 microsecond sampling frequency, a digitized sound pattern signal includes a number of samples that are spaced apart at equal intervals of about 125 microseconds. Therefore, the digitized sound pattern includes about 8000 samples per second, regardless of how the corresponding analog sound pattern signal is defined.

It should be understood that the pilot signal 201 of FIG. 2 represents one example of an essentially unlimited number of pilot signals than can be used in conjunction with the OWD measurement method and system described herein. For example, other pilot signals may represent variants of the pilot signal 201. Some variants of the pilot signal 201 may include multiple Gaussian-shaped signal portions separated by either a varying duration of silence or a varying duration of comb portion. Also, some variants of the pilot signal 201 may not include either the silence portion 203 or the comb portion 211. The point to be understood is that the pilot signal 201 can be defined in many different ways so long as the pilot signal can be transmitted through the communication network with minimal distortion, and so long as the pilot signal can be recognized through application of a suitable pilot recognition algorithm to incoming signals at the receiving device.

Figure 3:
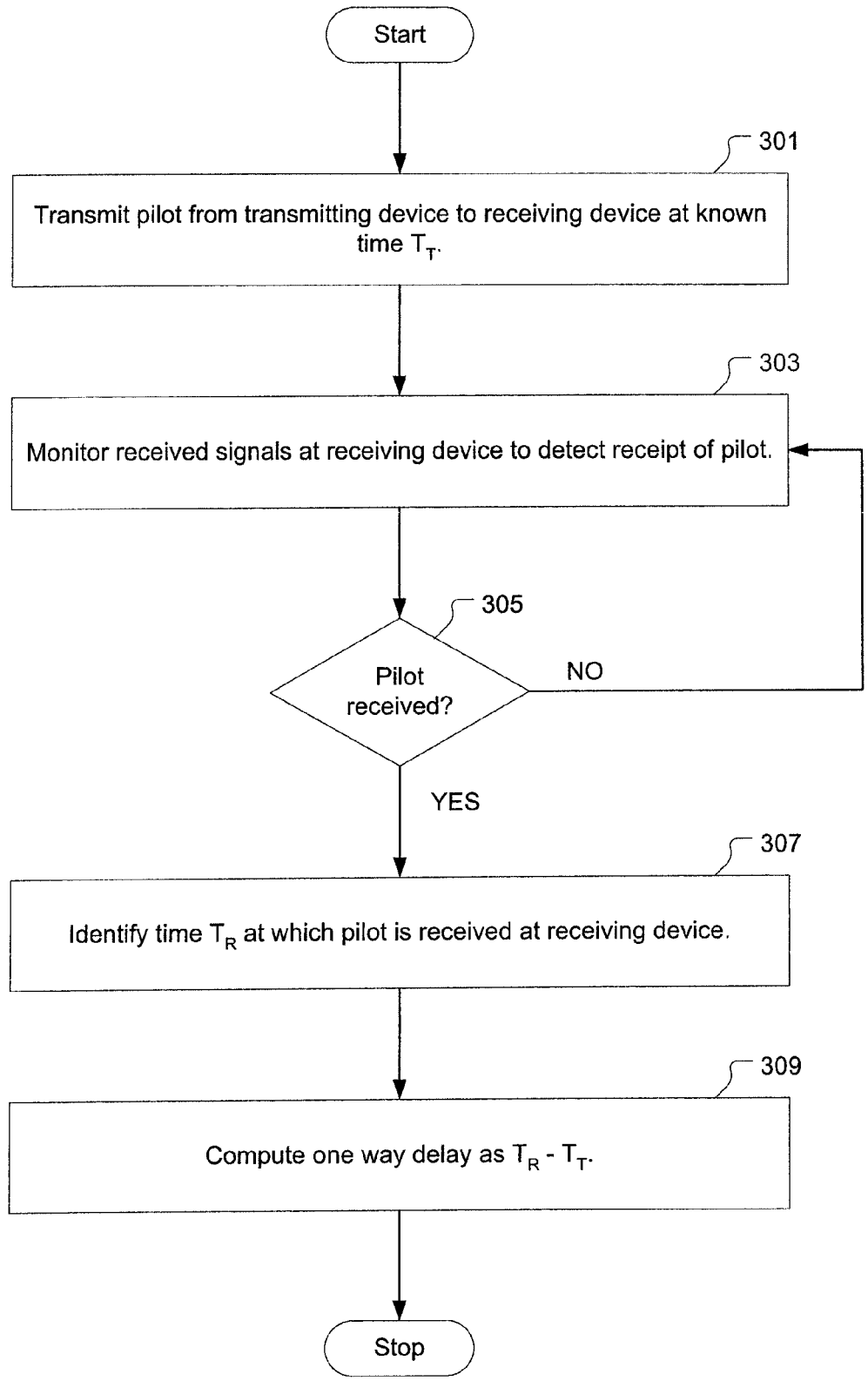
FIG. 3 is an illustration showing a method for determining OWD through a communication network, in accordance with one embodiment of the present invention.

FIG. 3 is an illustration showing a method for determining OWD through a communication network, in accordance with one embodiment of the present invention. It should be understood that the communication network includes a transmitting device and a receiving device, wherein a clock of the receiving device is synchronized with a clock of the transmitting device. Additionally, it should be understood that the communication network can be either a homogeneous network or a heterogeneous network. A homogeneous network is defined as communication network that includes only analog devices or only digital devices. A heterogeneous network is defined as a communication network that includes a combination of analog devices and digital devices. It should be appreciated that in the heterogeneous network, the pilot signal may undergo a number of transformations between the analog and digital domains.

The method includes an operation 301 for transmitting a pilot signal from a transmitting device through the communication network to a receiving device. In operation 301, the pilot signal is transmitted through a voice channel at a known transmit time $T_T$. As previously discussed, the pilot signal is defined to be transmitted through the communication network with minimal distortion. Also, the pilot signal is further defined to be detectable upon receipt. In one embodiment, the pilot signal is stored in a digital format within a memory. In this embodiment, transmission of the pilot signal includes reading the pilot signal as digital data from the memory, and transmitting the digital data representing the pilot signal over an appropriate communication fabric to the communication network.

The time required for the pilot signal to be read from memory and placed on the communication fabric is less than about 1 microsecond. The OWD measurement accuracy of the present method is on the order of about 1 millisecond. Therefore, the time required for the pilot signal to be read from memory and placed on the communication fabric is negligible with respect to the accuracy of the OWD measurement. It should be further appreciated that the threshold for OWD manifestations in voice communication is about 300 milliseconds. Therefore, the OWD measurement accuracy of about 1 millisecond is sufficient to evaluate the acceptability of OWD through the communication network under test.

In one embodiment, the OWD measurement method of FIG. 3 is initiated by a testing application operating on a computing device defined to control the transmitting device. In this embodiment, an interrupt is sent to a host processor of the computing device by the testing application when the OWD measurement is to be performed. Upon receipt of the interrupt, the host processor will transmit the pilot signal in conjunction with the next integer number of seconds as determined by the clock of the transmitting device. Thus, in this embodiment, the transmit time of the pilot signal is defined as an integer number of seconds.

The method also includes an operation 303 for monitoring signals received in the voice channel at the receiving device to detect receipt of the pilot signal. It should be understood that the receiving device can be defined to receive incoming signals in the form of analog signals or digitized samples of analog signals. Regardless of the format in which the incoming signals are received, the receiving device functions to apply a pilot detection algorithm to the incoming signals, wherein the pilot detection algorithm is defined to identify a presence of the pilot within the incoming signals. The method further includes a decision operation 305 for querying whether the pilot signal has been received at the receiving device. If the pilot signal has not been received, the method continues with operation 303 for monitoring the signals received in the voice channel at the receiving device. If the pilot signal is detected as being received at the receiving device, the method proceeds with an operation 307.

The operation 307 is performed to identify a receipt time $T_R$ corresponding to the time at which the pilot signal is received at the receiving device. In one embodiment, the receipt time $T_R$ is identified by reading a time stamp associated with receipt of the pilot signal at the receiving device. In one embodiment, the receipt time $T_R$ of the pilot signal corresponds to the time at which the maximum of the Gaussian-shaped portion of the pilot signal is received at the receiving device. In another embodiment, the receipt time $T_R$ of the pilot signal corresponds to the time at which the earliest portion of the pilot signal arrives as the receiving device. In this embodiment, the maximum of the Gaussian-shaped portion of the pilot signal can be used as a temporal reference point for determining when the earliest portion of the pilot signal arrives as the receiving device. Following the operation 307, the method proceeds with an operation 309 for determining the OWD through the communication network by computing the difference between the receipt time of the pilot signal and the transmit time of the pilot signal, i.e., $OWD=T_R-T_T$. If the OWD is known to be less than one second, the OWD delay can be determined by simply observing the fractional component of the receipt time $T_R$. This simplification is afforded by the synchronization of the receiving device clock with the transmitting device clock, and by the transmission of the pilot signal at a time corresponding to an integer number of seconds.

Figure 4A:
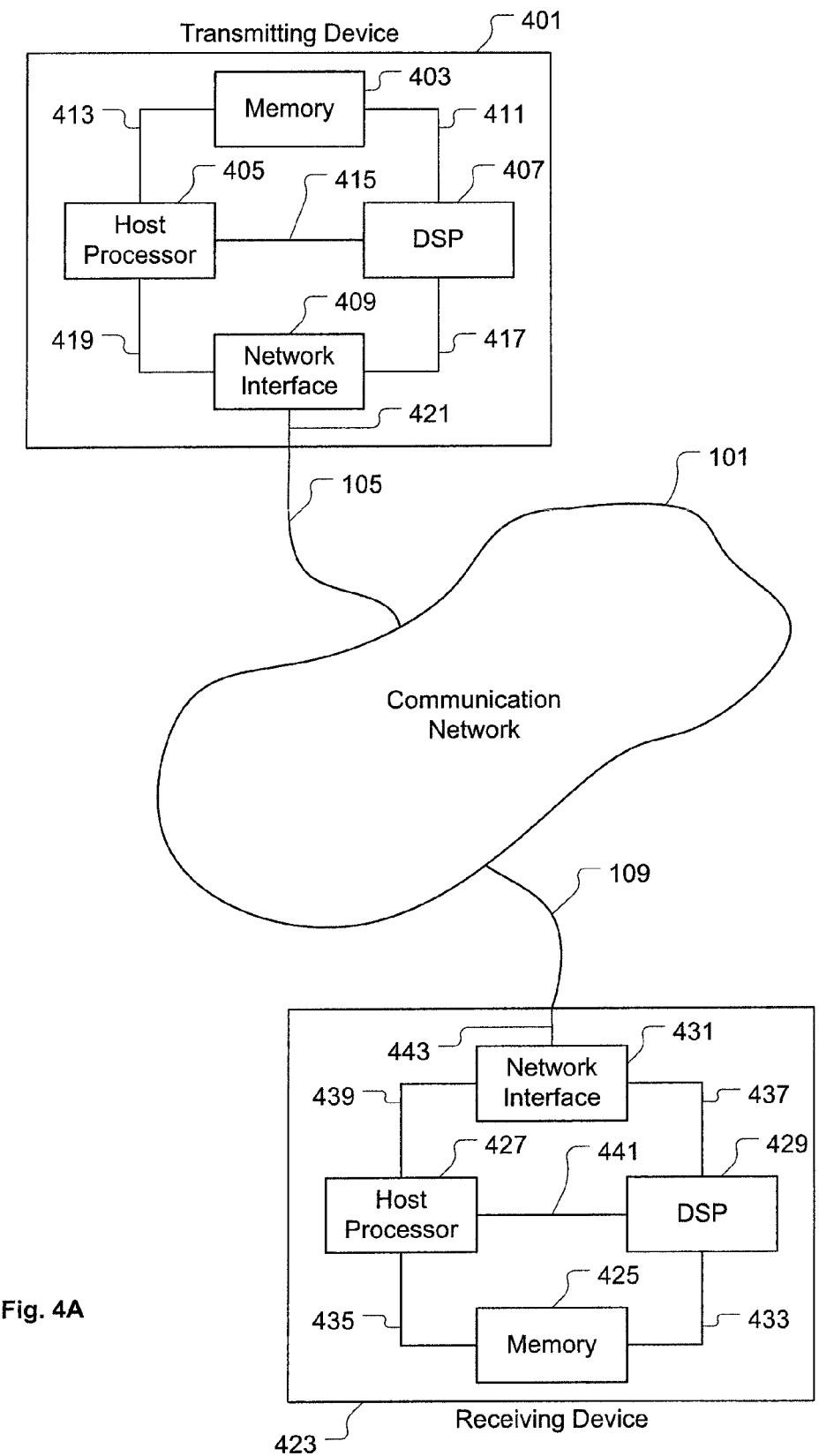
FIG. 4A is an illustration showing a system for determining OWD through a communication network, in accordance with one embodiment of the present invention.

FIG. 4A is an illustration showing a system for determining OWD through a communication network, in accordance with one embodiment of the present invention. The system includes a transmitting device 401 defined to communicate with a communication network 101 under test, through a connection 105. The system also includes a receiving device 423 defined to communicate with the communication network 101 under test, through a connection 109. The communication network 101 under test can be either a homogeneous network or a heterogeneous network. As previously discussed, a homogeneous network is defined as a communication network that includes only analog devices or only digital devices. A heterogeneous network is defined as a communication network that includes a combination of analog devices and digital devices. In the heterogeneous network, voice channel signals may undergo a number of transformations between the analog and digital domains. The system for determining OWD as shown in FIG. 4A does not require knowledge of the configuration or operation that defines the communication network 101 under test.

The transmitting device 401 is defined to include a host processor 405, a memory 403, a digital signal processor (DSP) 407, and a network interface 409. The host processor 405 is defined to communicate with the memory 403, the DSP 407, and the network interface 409, through connections 413, 415, and 419, respectively. The DSP 407 is defined to communicate with the memory 403, the host processor 405, and the network interface 409, through connections 411, 415, and 417, respectively. The network interface 409 is defined to communicate through a connection 421 with the connection 105 to the communication network 101 under test.

The receiving device 423 is defined in a manner similar to the transmitting device 401. The receiving device 423 is defined to include a host processor 427, a memory 425, a DSP 429, and a network interface 431. The host processor 427 is defined to communicate with the memory 425, the DSP 429, and the network interface 431, through connections 435, 441, and 439, respectively. The DSP 429 is defined to communicate with the memory 425, the host processor 427, and the network interface 431, through connections 433, 441, and 437, respectively. The network interface 431 is defined to communicate through a connection 443 with the connection 109 to the communication network 101 under test. Additionally, a clock of the receiving device 423 is synchronized with a clock of the transmitting device 401.

In one embodiment, a testing application can be executed on the host processors 405 and 427 of the transmitting device 401 and receiving device 423, respectively. The testing application can be defined to direct performance of the OWD measurement. For example, when the testing application is ready to perform the OWD measurement, the testing application can send an interrupt to the host processor 405 of the transmitting device 401 to initiate the OWD measurement. In response to the interrupt, the host processor 405 will initiate the OWD measurement by transmitting a pilot signal in a voice channel through the communication network 101 at a known transmit time. In one embodiment, the known transmit time corresponds to the next integer number of seconds following receipt of the interrupt by the host processor 405.

In one embodiment, the host processor 405 communicates an instruction to the DSP 407 to transmit the pilot signal. In accordance with the instruction, the DSP 407 reads the pilot signal from the memory 403. In one embodiment, the pilot signal is stored in a digital format, e.g., way file, in the memory 403. The DSP 407 then proceeds with transmission of the pilot signal through the network interface 409 in the voice channel. The pilot signal is then transmitted through the communication network 101 to the receiving device 423. It should be appreciated that establishment of a communication channel between the transmitting device 401 and the receiving device 423, through the communication network 101, is performed in accordance with normal operating condition technologies and protocols of the communication network 101 under test. In another embodiment, the host processor 405 reads the pilot signal from the memory 403 and proceeds with transmission of the pilot signal through the network interface 409 in the voice channel. In this embodiment, the DSP 407 is not involved in the OWD measurement process.

The receiving device 423 is defined to receive signals in the voice channel from the communication network 101. More specifically, the receiving device 423 receives incoming signals in the voice channel through the network interface 431. During the OWD measurement, the DSP 429 of the receiving device 423 is responsible for executing a pilot signal recognition algorithm for detecting receipt of the pilot signal at the receiving device 423. Upon detecting receipt of the pilot signal at the receiving device 423, a receipt time of the pilot signal is recorded. A difference between the receipt time of the pilot signal at the receiving device 423 and the transmit time of the pilot signal from the transmitting device 401 represents the OWD through the communication network 101.

In digital telephony, the DSP 429 performs the pilot signal recognition algorithm on all communications, e.g., digitized samples, received through the network interface 431 of the receiving device 423. The pilot signal recognition algorithm processes all incoming data to the receiving device 423 to determine if the pilot signal is present. Additionally, all incoming data is time stamped. Therefore, when the pilot signal is recognized as having been received, the time stamp associated with the received pilot signal data is used as the receipt time in the OWD computation. In one embodiment, the time stamp associated with the maximum of the Gaussian-shaped portion of the pilot signal is used to compute the OWD. In another embodiment, the maximum of the Gaussian-shaped portion of the pilot signal is used as a temporal reference for identifying another location in the pilot signal to be used in computing the OWD.

In analog telephony, the DSP 429 performs the pilot signal recognition algorithm on all analog signals received through the network interface 431 of the receiving device 423. The pilot signal recognition algorithm processes all incoming data to the receiving device 423 to determine if the pilot signal is present. In one embodiment, the incoming analog signals are digitized and time stamped for processing by the DSP 429. When the pilot signal is recognized by the DSP 429 as having been received, the time stamp associated with the received pilot signal data is used as the receipt time in the OWD computation. As previously mentioned, in one embodiment, the time stamp associated with the maximum of the Gaussian-shaped portion of the pilot signal is used to compute the OWD. Alternatively, the maximum of the Gaussian-shaped portion of the pilot signal is used as a temporal reference for identifying another location in the pilot signal to be used in computing the OWD. With respect to the above-described embodiments, it should be understood that any function performed by the DSP 407 or the DSP 429 can also be performed by software operating on the host processor 405 or the host processor 427, respectively.

Figure 4B:
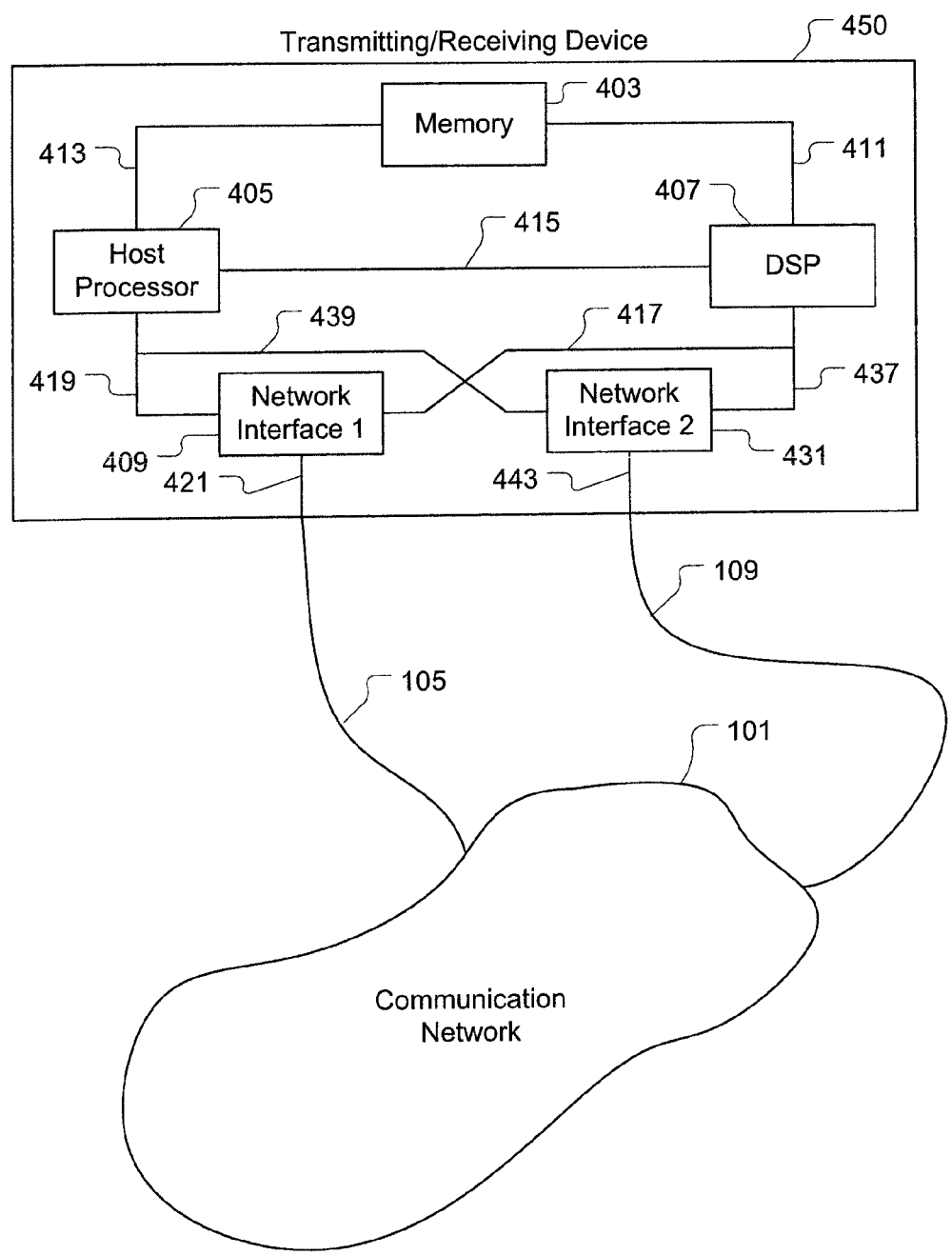
FIG. 4B is an illustration showing a system for determining OWD through a communication network, in accordance with another embodiment of the present invention.

FIG. 4B is an illustration showing a system for determining OWD through a communication network, in accordance with another embodiment of the present invention. The system of FIG. 4B is essentially equivalent to the system of FIG. 4A, with the exception that the transmitting device 401 and the receiving device 423 are combined into a single transmitting/receiving device 450. More specifically, the transmitting device 401 and the receiving device 423 are combined within the transmitting/receiving device 450 to share a common host processor 405, a common memory 403, and a common DSP 407. However, the transmitting/receiving device 450 is defined to include a first network interface 409 for transmission of the pilot signal, and a second network interface 431 for receipt of the pilot signal. The host processor 405 is defined to communicate with both the first network interface 409 and the second network interface 431 through connections 419 and 439, respectively. The DSP 407 is defined to communicate with both the first network interface 409 and the second network interface 431 through connections 417 and 437, respectively. The first network interface 409 communicates through a connection 421 with the connection 105 to the communication network 101. The second network interface 431 communicates through a connection 443 with the connection 109 to the communication network 101.

With respect to performing the OWD measurement, the system of FIG. 4B functions in the same manner as that previously described for the system of FIG. 4A. However, in the system of FIG. 4B, the pilot signal is transmitted through the first network interface 409 and received at the second network interface 431. It should be appreciated that in the system of FIG. 4B, synchronization of the transmitting device clock and receiving device clock is simplified due to combination of the transmitting and receiving devices into the single transmitting/receiving device 450.

The method and system for performing OWD measurement of the present invention includes a number of advantageous features. For example, the OWD measurement is performed in the voice channel. Therefore, the pilot signal can be transmitted from the transmitting device to the receiving device just as any other voice communication would be transmitted. Also, the OWD measurement can be performed on any communication network, whether it be a homogeneous communication network or a heterogeneous communication network, without regard to how the communication network is defined. The present invention is particularly useful when performing OWD measurements on heterogeneous communication networks that include some portion of VOW.

Another key feature of OWD measurement method and system of the present invention is the use of a pilot signal that can be transmitted with minimal distortion and can be recognized upon receipt. The present invention also benefits from the use of synchronized clocks on the transmitting side and receiving side, transmission of the pilot signal at a time corresponding to an integer number of seconds, and use of time stamps to compute the OWD. It should be understood that the present invention does not require any additional voice pattern to be attached to the pilot signal. However, the pilot signal-based OWD measurement of the present invention can be performed if a voice pattern is attached to the pilot signal. For example, a pilot signal used in conjunction with another voice pattern to perform a communication quality test other than OWD measurement can simultaneously be used to perform the OWD measurement in accordance with the method of the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a one-way delay through a communication network, comprising:
    transmitting a pilot signal from a transmitting device through the communication network to a receiving device at a known transmit time, wherein the pilot signal is a sound pattern including an acoustic temporal reference transmitted in a voice channel;
    monitoring signals received in the voice channel at the receiving device to detect receipt of the pilot signal;
    identifying a receipt time at which the acoustic temporal reference within the pilot signal is received at the receiving device; and
    determining the one-way delay as a difference between the receipt time of the temporal reference and the transmit time of the acoustic temporal reference.

2. A method for determining a one-way delay through a communication network as recited in claim 1, further comprising: synchronizing a clock of the receiving device with a clock of the transmitting device.

3. A method for determining a one-way delay through a communication network as recited in claim 1, wherein the pilot signal is defined to be transmitted through the communication network with minimum distortion, the pilot signal further defined to be detectable upon receipt.

4. A method for determining a one-way delay through a communication network as recited in claim 1, wherein transmitting the pilot signal includes reading the pilot signal in a form of digital data from a memory and transmitting the digital data.

5. A method for determining a one-way delay through a communication network as recited in claim 1, wherein the communication network can be either homogeneous or heterogeneous, wherein homogeneous is defined as including only analog devices or only digital devices, wherein heterogeneous is defined as including a combination of analog devices and digital devices.

6. A method for determining a one-way delay through a communication network as recited in claim 1, wherein the transmit time is defined as an integer number of seconds.

7. A method for determining a one-way delay through a communication network as recited in claim 1, wherein the signals received in the voice channel at the receiving device represent either analog signals or digitized samples of analog signals.

8. A method for determining a one-way delay through a communication network as recited in claim 1, wherein identifying the receipt time includes determining a time stamp associated with receipt of digitized samples representing the pilot signal.

9. A method for determining a one-way delay through a communication network, comprising:
    transmitting a pilot signal from a transmitting device through the communication network to a receiving device at a known transmit time, wherein the pilot signal is transmitted in a voice channel;
    monitoring signals received in the voice channel at the receiving device to detect receipt of the pilot signal;
    identifying a receipt time at which the pilot signal is received at the receiving device; and
    determining the one-way delay as a difference between the receipt time of the pilot signal and the transmit time of the pilot signal;
    wherein the pilot signal includes a Gaussian-shaped signal that is filled by a sinusoidal signal, a maximum of the Gaussian-shaped signal capable of being detected as a temporal reference within the pilot signal.

10. A method for determining a one-way delay through a communication network, comprising:
    transmitting a pilot signal from a transmitting device through the communication network to a receiving device at a known transmit time, wherein the pilot signal is transmitted in a voice channel;
    monitoring signals received in the voice channel at the receiving device to detect receipt of the pilot signal;
    identifying a receipt time at which the pilot signal is received at the receiving device; and
    determining the one-way delay as a difference between the receipt time of the pilot signal and the transmit time of the pilot signal;
    wherein identifying the receipt time includes determining a time corresponding to a maximum of a Gaussian shape within the pilot signal, the Gaussian shape being filled by a sinusoidal signal.

11. A system for determining a one-way delay through a communication network, comprising:
- a transmitting device defined to transmit a pilot signal in a voice channel that is a sound pattern including an acoustic temporal reference through the communication network at a known transmit time; and
- a receiving device defined to receive signals in the voice channel of the communication network, the receiving device further defined to detect receipt of the pilot signal to be transmitted from the transmitting device, the receiving device further defined to record a receipt time at which the acoustic temporal reference in the pilot signal is received at the receiving device, wherein a difference between the receipt time of the acoustic temporal reference and the transmit time of the acoustic temporal reference representing the one-way delay through the communication network,
- wherein a clock of the receiving device is adapted to be synchronized with a clock of the transmitting device.

12. A system for determining a one-way delay through a communication network as recited in claim 11, wherein the pilot signal is defined to be transmitted through the communication network with minimum distortion, the pilot signal further defined to be detectable upon receipt.

13. A system for determining a one-way delay through a communication network as recited in claim 11, wherein the transmitting device includes a memory in which the pilot signal is stored in a digitized format.

14. A system for determining a one-way delay through a communication network as recited in claim 11,
- wherein the communication network can be either homogeneous or heterogeneous, wherein homogeneous is defined as including only analog devices or only digital devices, wherein heterogeneous is defined as including a combination of analog devices and digital devices.

15. A system for determining a one-way delay through a communication network as recited in claim 11, wherein the transmitting device is defined to transmit the pilot signal at a time corresponding to an integer number of seconds.

16. A system for determining a one-way delay through a communication network as recited in claim 11, wherein the receiving device is defined to read a time stamp indicating the receipt time at which the pilot signal is received at the receiving device.

17. A system for determining a one-way delay through a communication network as recited in claim 11, wherein the transmitting device and the receiving device are combined within a single device having a memory, host processor, a first network interface for transmission of the pilot signal, and a second network interface for receipt of the pilot signal.

18. A system for determining a one-way delay through a communication network, comprising:
- a transmitting device defined to transmit a pilot signal in a voice channel through the communication network at a known transmit time; and
- a receiving device defined to receive signals in the voice channel of the communication network, the receiving device further defined to detect receipt of the pilot signal to be transmitted from the transmitting device, the receiving device further defined to record a receipt time at which the pilot signal is received at the receiving device, a difference between the receipt time of the pilot signal and the transmit time of the pilot signal representing the one-way delay through the communication network;
- wherein a clock of the receiving device is adapted to be synchronized with a clock of the transmitting device;
- wherein the pilot signal includes a Gaussian-shaped signal that is filled by a sinusoidal signal, a maximum of the Gaussian-shaped signal capable of being detected as a temporal reference within the pilot signal.

19. A system for determining a one-way delay through a communication network, comprising:
- a transmitting device defined to transmit a pilot signal in a voice channel that is a sound pattern including a temporal reference through the communication network at a known transmit time; and
- a receiving device defined to receive signals in the voice channel of the communication network, the receiving device further defined to detect receipt of the pilot signal to be transmitted from the transmitting device, the receiving device further defined to record a receipt time at which the temporal reference in the pilot signal is received at the receiving device, wherein a difference between the receipt time of the temporal reference and the transmit time of the temporal reference representing the one-way delay through the communication network,
- wherein a clock of the receiving device is adapted to be synchronized with a clock of the transmitting device, and
- wherein the receiving device is defined to determine a time corresponding to a maximum of a Gaussian shape within the pilot signal, the Gaussian shape being filled by a sinusoidal signal.

* * * * *